Nov. 3, 1942.       G. E. DUNN       2,300,658
UNIVERSAL JOINT
Filed May 8, 1941

INVENTOR
George E. Dunn.
BY
Harness, Dickey & Pierce
ATTORNEYS.

Patented Nov. 3, 1942

2,300,658

UNITED STATES PATENT OFFICE 2,300,658

UNIVERSAL JOINT

George E. Dunn, Dearborn, Mich., assignor to Universal Products Company Incorporated, Dearborn, Mich., a corporation of Delaware Application May 8, 1941, Serial No. 392,450

5 Claims. (Cl. 64—17)

The invention relates generally to flexible connections and it has particular relation to improvements in universal joints.

In certain respects, the invention constitutes an improvement over the inventions embodied in my copending applications for patent Serial No. 353,016, filed August 17, 1940, and Serial No. 383,744, filed March 17, 1941.

In such copending applications for patent, universal joints are disclosed which include cross members having trunnions and ball elements turnable thereon. These ball elements are located in sockets in the arms of yoke members and cap elements retain the balls within the sockets. Roller bearings are employed within the balls and around the trunnions and self-alignment of the ball elements enables obtaining full roller bearing contact regardless of torque conditions. This ball roller bearing contact enables reducing the size of the joint since one important factor governing the size of joints is the capacity of the roller bearings to transmit torque loads and if they are subjected to localized bearing engagement, a larger roller bearing unit is required and hence a larger joint is necessary.

One object of the present invention is to provide an improved universal joint of the general type mentioned having an improved type of cap element capable of taking large torque loads.

Another object of the invention is to provide a joint such as mentioned wherein the cap element is formed with the greater part of the socket for receiving the ball element.

Another object of the invention is to provide a universal joint such as mentioned which is economical to manufacture, efficient in operation, and which will have the general self-aligning characteristics set forth in the prior patent applications to which attention has already been directed.

For a better understanding of the invention, reference may be had to the drawing wherein.

Figure 1:
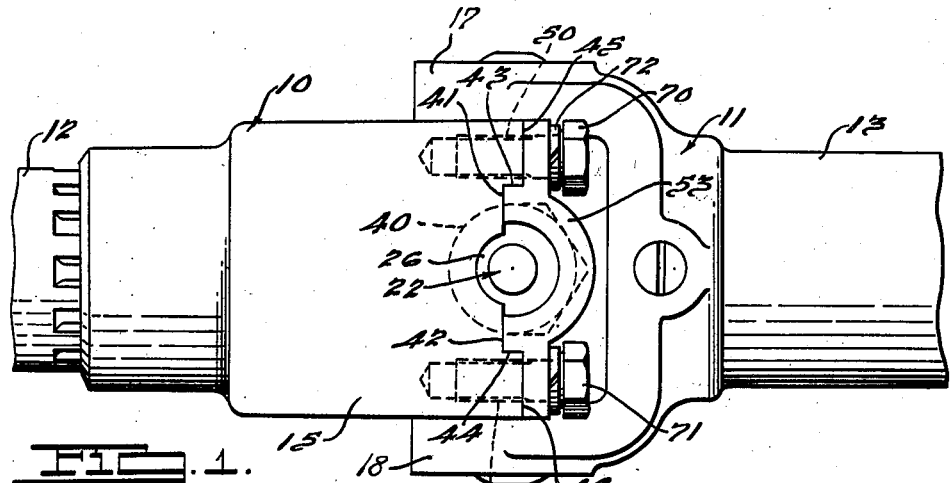
Figure 1 is an elevational view of a universal joint constructed according to one form of the invention.

Referring to Fig. 1, the universal joint illustrated includes at the left end a yoke 10 and at the right end a yoke 11 respectively connected to shaft members 12 and 13. The yoke 10 is provided with arms 15 and 16 and similarly the yoke 11 is provided with arms 17 and 18. The respective arms are located in 90° spaced relation and are operatively associated with a cross 20 having trunnions 21.

Each of the trunnions 21 projects outwardly into a ball element 22 comprising a ball segment 23 having a bore 24 receiving the trunnion and an end segment 26 fitting into the end of the segment 23 as indicated at 28. Small cylindrical rollers are disposed in the bore 24 and around the trunnions 21 so that the latter may turn freely within the ball although a close running fit is desirable, as will be understood.

The outer end of the trunnion substantially contacts with the inner surface of the ball segment 26 as indicated at 30, so that the cross may be centered with respect to the joint axis by centering of the balls. At the inner ends of the rollers 29, a wear ring 31 is provided which rests on an annular shoulder 32 on the trunnion. The bearing described is sealed by means of an annular sealing ring 33 disposed between the inner end of the ball segment 23 and the shoulder 32 and which is retained in position by means of an annular ferrule 35 held on the base portion of the trunnion.

All four trunnions are provided with bearing assemblies such as described and it will be appreciated that through turning movement of the ball elements, the latter, rollers and trunnions may be maintained in alignment regardless of torque loads.

Figure 2:
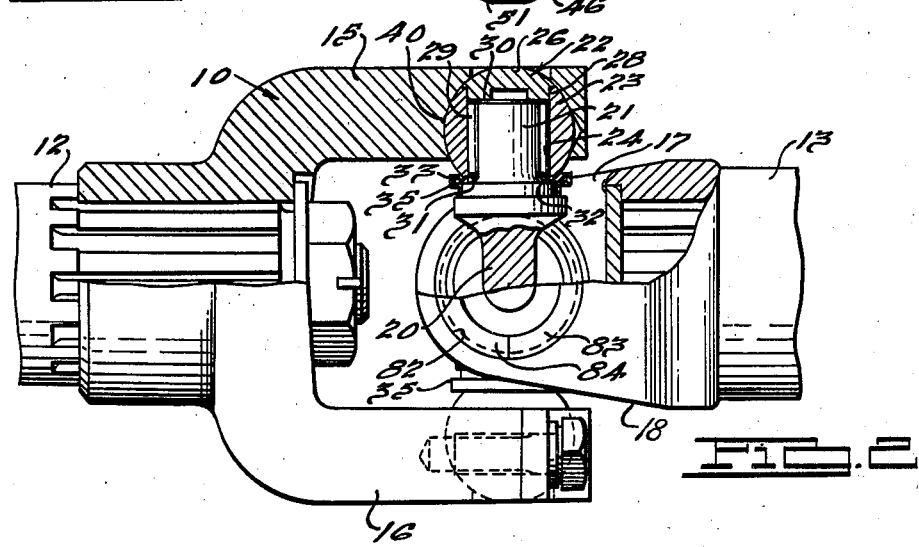
Fig. 2 is a side view of the structure shown by Figure 1 with certain parts broken away and shown in cross-section.

Now referring in particular to the yoke arms 15 and 16, each of the arms as shown in Fig. 2 has a frusto-spherical socket or recess 40, which is less than semi-spherical in extent. As shown by Figure 1, each arm at circumferentially opposite sides of the recess has a circumferentially extending flat surface 41 and 42, axially directed shoulders 43 and 44 joining the surfaces 41 and 42 and second flat surfaces 45 and 46 beyond the shoulders 43 and 44. The portions 45 and 46 of the arms have threaded apertures 50 and 51 which are adapted to receive fastening bolts presently to be described.

Figures 3, 4:
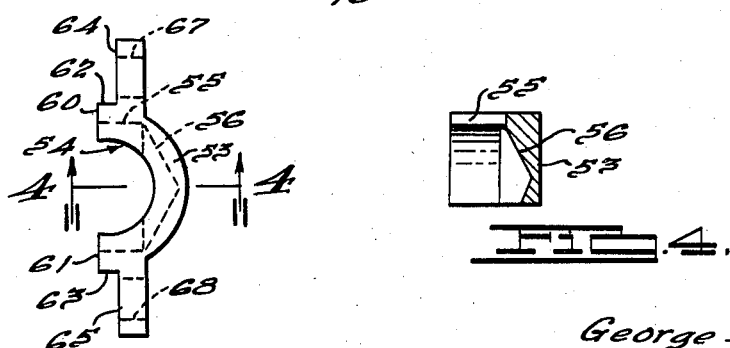
Fig. 3 is a detailed view illustrating one of the cap elements as seen when removed from the joint.
Fig. 4 is a cross-sectional view taken substantially along the line 4—4 of Fig. 3.

The ball member seats in the recess 40 and is retained therein by means of a cap element 53 which, as best shown by Figs. 3 and 4, has a recess 54 defined by a cylindrical portion 55 and a bottom conical portion 56. The cylindrical portion 55 is substantially of the same diameter as that of the ball so that the ball substantially contacts opposite side walls thereof. The ball also has substantially line contact with the conical portion 56 and it is held against the spherical surface 40 of the yoke arm, so that the ball has contact with the surfaces at both ends of the recess and substantially contacts the side walls of the cylindrical portion 55 of the recess. The contacting relation is such that the ball will be held normally against turning about the axis of the trunnion although it will not be held so tightly that it can't turn for the purpose of obtaining the self-aligning feature mentioned heretofore and considered in further detail in the copending applications already mentioned. It may be observed too, that the outer parts of spherical part 40 of the recess, the conical portion 56, and the cylindrical portion 55, act to hold the ball centered with respect to the joint axis since such parts of the recess have contact with the ball surface beyond the center of the ball. It may be noted also that such contact is such as to engage the ball segment 26.

At circumferentially opposite sides of the recess in the cap, the latter has opposed surfaces 60 and 61 adapted to substantially contact and fit the surfaces 41 and 42 on the yoke arm, shoulders 62 and 63 to substantially contact the shoulders 43 and 44 of the arm and outer surfaces 64 and 65 adapted to substantially contact the surfaces 45 and 46 on the arm. The outer portions of the cap are apertured as indicated at 67 and 68 for receiving fastening bolts 70 and 71 threaded into the apertures 50 and 51 of the yoke arm and each bolt head engages a lock washer 72. It may be noted here that the openings 67 and 68 in the cap are slightly larger than the bolt diameter so that torque loads imparted to the cap will be taken through the shoulders 43, 44, 62, and 63 so as to thereby avoid torque loads on the bolts.

As stated before, it is desirable that the ball contact the spherical recess 40 and conical bottom 56 and if need be contact of these parts of the recess and ball may be secured or assured by so constructing the cap that the ball is clamped simultaneously with or slightly before contact of the cap with the circumferentially extending surfaces of the yoke arm. If desired, the ball may actually have a certain degree of press fit with the cylindrical part 55 of the cap recess, although it is to be understood that self-aligning of the ball with the rollers and trunnion is to be obtained even with small torque loads while still obtaining the feature that the ball is prevented from turning about the trunnion axis. In order words, the ball does not normally turn about the trunnion axis, but it can turn under torque load about the recess axis to effect the self alignment. With respect to shoulders 43 and 44 and 62 and 63 on the yoke arm and cap, respectively, it is desirable that a close fit be obtained at these points so that the cap will not move circumferentially with respect to the yoke arm.

It is apparent that torque loads imparted through the cylindrical portion of the recess are directed through the side wall of the cap, but since the shoulders 43 and 44 and 62 and 63 are located where the major torque loads are directed, such torque loads while being directed through the cap will be directed through the extensions on the yoke arm to thereby prevent a condition when torque loads might be carried through the cap at points beyond the end of the yoke arm. It will be understood that the parts may be constructed of suitably hard metal which will resist loading as it will be readily appreciated by those skilled in the art and that the cap may be constructed through stamping operations or the like. It may be observed too that portions 55 and 56 of the recess in the cap may be formed by a boring operation. Again, it may be stated that the spherical recess 40 in the yoke arm may be varied in shape and in fact a cylindrical recess may be used or the recess may be conical or it may be partly cylindrical and partly conical as in the case of the cap.

The arms on the yoke 11 may be similarly associated with ball and trunnion bearing assemblies such as described and, if desired, the yoke 11 may be identical to the yoke 10 so that the arms on each yoke would have the caps described. However, in the structure illustrated, the arms 17 and 18 on yoke 11 are provided with cylindrical openings indicated at 82 and for contacting the balls, adapter elements 83 and 84 may be employed. Such adapter elements may correspond to those disclosed and claimed in my copending application for patent Serial No. 392,449, filed May 8, 1941.

It might be stated, however, that each of the adapter elements may have a cylindrical exterior surface for fitting half of the opening in the yoke arm and a frusto-spherical interior for fitting one-half of the ball. A shoulder on the two adapter elements is provided for engaging the inner side of the yoke arm so that the adapter and ball may be centered with respect to the joint axis.

Although only one form of the invention has been illustrated and described in detail, it will be apparent to those skilled in the art that various modifications may be made without departing from the spirit of the invention.

What is claimed is:

1. In a universal joint of the four trunnion type, a yoke arm having a ball seating surface at its free end, a ball element seated on the surface and having a diametrically extending bore, a trunnion projecting into the bore, and a cap fastened to the end of the arm and having a recess receiving the ball element, the recess in the cap being of such depth longitudinally of the joint axis that the longitudinally extending side walls of the recess serve as torque transmitting walls with the center of the ball element located intermediate the ends of such side walls.

2. In a universal joint of the four trunnion type, a yoke arm having a ball seating surface at its free end, a ball element seated on said surface and having a diametrically extending bore, a trunnion projecting into the bore, a cap fastened to the end of the arm and having a recess receiving the ball element, bolts fastening the cap to the arm, and interengaging shoulders on the cap and member for transmitting torque loads from one to the other so as to avoid torque loads on the bolts, the recess in the cap being of such depth longitudinally of the joint axis that the longitudinally extending side walls of the recess serve as torque transmitting walls with the center of the ball element located intermediate the ends of such side walls.

3. In a universal joint of the four trunnion type, a bearing assembly comprising a member having a recess for partly receiving a ball element, a ball element seated in the recess and having a diametrically extending bore for receiving a trunnion, a trunnion projecting into the bore, a second member having a recess partly receiving the ball element, said second mentioned recess having opposed ball engaging side walls defining portions of a cylinder having its axis extending longitudinally of the joint axis, bolts fastening the members together, and interengaging shoulders on the members for transmitting torque loads from one to the other so as to avoid torque loads on the bolts.

4. In a universal joint of the four trunnion type, a yoke arm having a ball seating surface at its free end, a ball element seated on the surface and having a diametrically extending bore, a trunnion projecting into the bore, and a cap fastened to the end of the arm and having a recess receiving the ball element, such recess in the cap having opposed ball engaging side walls defining portions of a cylinder having its axis extending longitudinally of the joint axis and the center of the ball being located intermediate the ends of such walls, so that the latter serve as torque transmitting walls.

5. In a universal joint of the four trunnion type, a yoke arm having a ball seating surface at its free end, a ball element seated on said surface and having a diametrically extending bore, a trunnion projecting into the bore, a cap fastened to the end of the arm and having a recess receiving the ball element, bolts fastening the cap to the arm, and interengaging shoulders on the cap and member for transmitting torque loads from one to the other so as to avoid torque loads on the bolts, said recess in the cap having opposed ball engaging side walls defining portions of a cylinder having its axis extending longitudinally of the joint axis and the center of the ball being located intermediate the ends of such walls, so that the latter serve as torque transmitting walls.

GEORGE E. DUNN.